United States Patent [19]

Munson

[11] 4,096,344

[45] Jun. 20, 1978

[54] ELECTRIC ARC FURNACE CONTROL SYSTEM

[75] Inventor: William A. Munson, Williamsville, N.Y.

[73] Assignee: Westinghouse Electric Corp., Pittsburgh, Pa.

[21] Appl. No.: 728,106

[22] Filed: Sep. 30, 1976

[51] Int. Cl.² .............................................. H05B 7/148
[52] U.S. Cl. ...................................................... 13/13
[58] Field of Search ................................... 13/9, 12, 13

[56] References Cited

U.S. PATENT DOCUMENTS 3,662,075  5/1972  Sakai et al. ................................ 13/13

Primary Examiner—R. N. Envall, Jr.
Attorney, Agent, or Firm—James J. Wood

[57] ABSTRACT

This disclosure relates to an electric arc furnace control system for positionally displacing the consumable furnace electrodes. Each electrode is coupled to an electric motor and arranged for vertical height displacement in relation to the material in the furnace. An arc current control signal is derived by comparing the actual arc current with a reference electrode arc current. In addition, a reactive power control signal is also derived by comparison of the (actual reactive power/actual real power) with a desired ratio of (reactive power/real power). The arc current control and the reactive power control signals are algebraically summed to provide an output error signal which is sent to the respective electric motors to provide rectilinear displacement of the electrodes.

5 Claims, 2 Drawing Figures

ELECTRIC ARC FURNACE CONTROL SYSTEM

BACKGROUND OF THE INVENTION

1. Field of the Invention

This invention relates to an electric arc furnace control system for providing vertical displacement of the consumable electrodes to realize optimum operation.

2. Description of the Prior Art

Prior art systems for electric arc furnace control are responsive to arc current and arc voltage, the electrode position being regulated by maintaining a fixed ratio between arc voltage and arc current in accordance with well known impedance regulation technique. However, it has been recognized that the impedance alone does not provide accurate melting information by reason of the fact that melting power does not bear a linear relationship to arc impedance. U.S. Pat. No. 3,435,121 to Jackson teaches that the electrode or electrodes should be controlled by means of a control signal which is a function of the electrode melting power averaged over a period of time. Additionally, another signal is provided which is a function of the power factor of the power supplied to the furnace, compared with a desired power factor. These two signals, respectively functions of power and power factor, are then used to raise or lower the electrodes.

SUMMARY OF THE INVENTION

This invention relates to an electric arc furnace control system for controlling the displacement of one or more electrodes in relation to the work material in the furnace. Means are provided for deriving an arc current control signal by comparing the actual electrode arc current with a reference electrode current. Means are also provided for deriving a reactive power control signal by comparing the ratio of (actual reactive power/actual real power) with a desired reference ratio of (reactive power/real power). Finally, means for summation to receive the arc current and reactor power control signals and derive an output error signal which is a function of the desired rectilinear displacement of said electrode to determine the arc length.

The instant invention provides a more flexible and faster control system based on arc current and reactive power control. It has been observed that small changes in the power factor produce much larger changes in reactive power; therefore it is more accurate to track reactive power for control purposes. Additionally, it has been observed in practical electric furnace operation, that in the melt-down period just prior to cave-in, the reactive power goes up rapidly. (A cave-in occurs when the burden or charge drops in on the electrode producing a short from electrode to electrode.) Thus if the reactive power is monitored, the electrode can be withdrawn prior to cave-in, protecting the electrode from damage and reducing the possibility of a short between electrodes which is disruptive in furnace operation. Rapid increase in reactive power may also indicate furnace lining burning while in the refining mode.

Further, maximum power transfer occurs at a power factor of 0.707 (cosine 45°). However, to always set the controls for a power factor of 0.707 may not represent optimum operating conditions. During operation, the electrodes and the furnace lining are consumed so that the furnace has to be periodically shut down to renew these consumables. Each furnace has its own particular operating characteristic and the operator through experience best knows the range of operating parameters under prevailing conditions. The control system of the invention permits the operator to select the desired ratios for arc current and reactive power.

Figure 1:
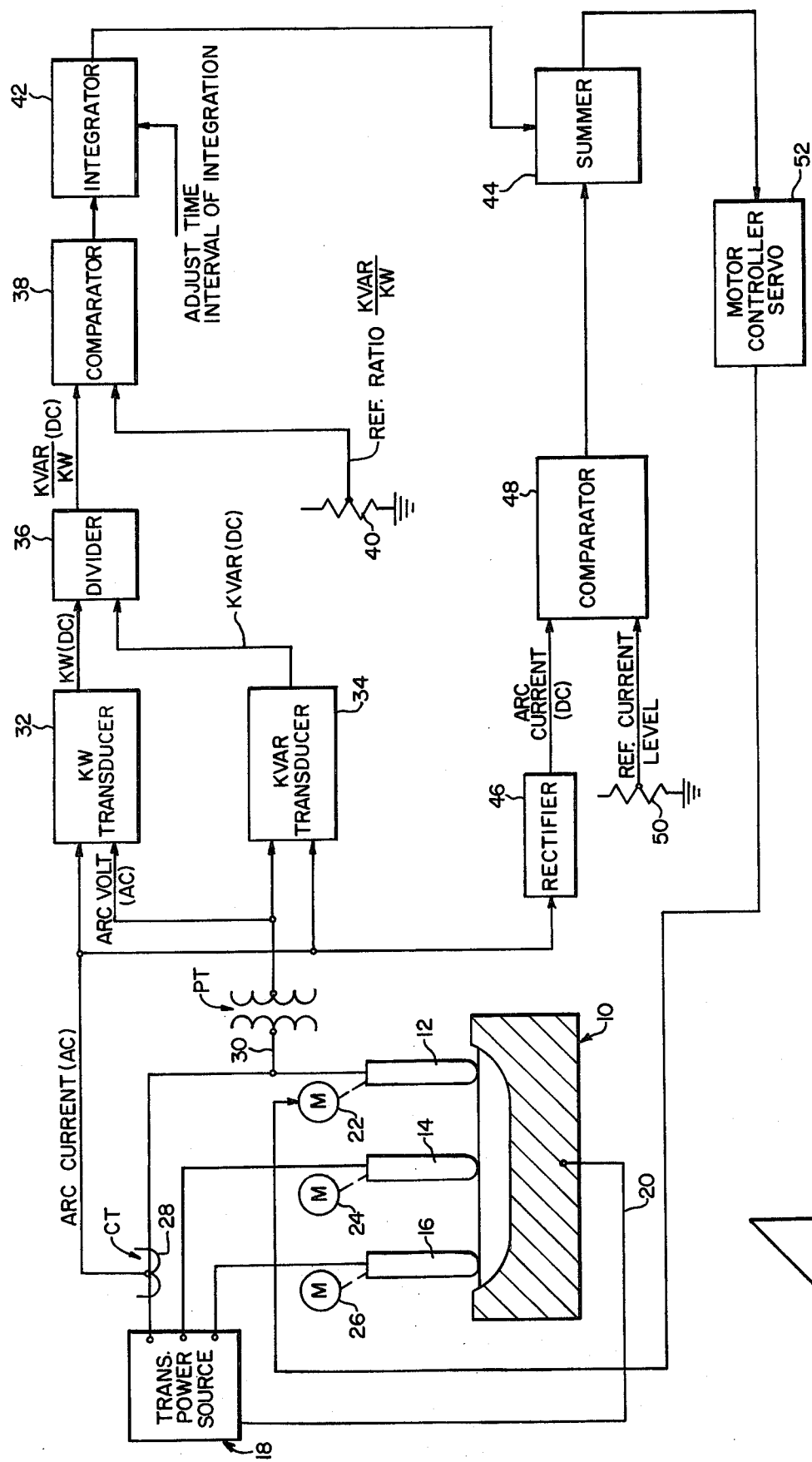
FIG. 1 is an electrical schematic of the present electric arc furnace control system for controlling the displacement of the furnace electrodes in accordance with the invention.

Referring to FIG. 1 there is shown an arc melting furnace indicated generally at 10, having suspended therein three electrodes 12, 14 and 16, each of which is electrically connected to a different phase of a three phase transformer power source 18. The neutral 20 of the three phase transformer 18 is connected to the base 11 and work material 13 of the furnace 10. The electrodes 12, 14, 16 are displaced in relation to the work material 13 by means of electrical motors 22, 24, 26, respectively, mechanically coupled to these electrodes.

The electrical control circuitry of the instant invention provides an identical control arrangement for each electrode, and hence only the control circuitry for electrode 12 is depicted and described herein in detail.

A current transformer 28 provides an a.c. signal which is a function of the arc current through electrode 12 and the burden or work material 13 (i.e. the charge or contents of the furnace). A potential transformer 30 provides a signal which is a function of the voltage across the electrode and the burden 13. The a.c. current signal and the a.c. voltage signal are applied to kilowatt transducer 32 and to kilovar transducer 34. These transducers are commercially available instruments such as Watt transducer type VP4-846 and VAR Transducer type VV-846 as presently manufactured and sold by Westinghouse Electric Corporation, Newark, N.J., and they perform the following operations:

Real power (KW) = voltage $x$ arc current $x$ cos of the phase angle

Reactive power (VARS) = arc voltage $x$ arc current $x$ sin of the phase angle, and deliver d.c. signals which are functions of real and reactive power respectively.

The signals KW(DC) and KVAR(DC) are then sent to a divider 36 which performs the division:

(KVAR(DC)/KW(DC))

The quotient from divider 36 is applied to a comparator 38 as a first input. A second input to the comparator 38 is a desired reference ratio (KVAR/KW) which is applied by means of an operator setting of potentiometer 40. The compared output from comparator 38 is applied to integrator 42 (the time interval of integration is adjustable). The integrated output is applied as one input to summer 44.

The arc current (AC) signal is also applied to rectifier 46 and the rectified output signal, representing arc current d.c., is applied to one input of a comparator 48. A second input to the comparator 48 is a desired reference arc current level which is provided by an operator adjustment of a potentiometer 50. The output of the comparator 48 is applied to summer 44. The algebraically summed output of summer 44 is applied to a motor controller servo 52, the output of which is applied to motor 22 for the purpose of bilaterally displacing the position of the electrode 12 in the vertical direction as required to provide desired ambient furnace operating conditions.

Present control regulator systems for arc furnaces are working on the basis of being impedance regulators, i.e. they use the furnace voltage as a reference and then attempt to maintain a certain ratio between furnace voltage and furnace current on a per phase basis, as the controlling element to determine the electrode height (arc length) from the material in the furnace. This system, however, fails to take into account the change in impedance phase angle as the components of the furnace are highly resistive in nature. Thus, a relatively wide change in phase angle can result in only a minor change in total impedance since the impedance is based on both the reactive and real power.

Where the furnaces are presently attempting to use a power factor control system, the power factor measured is on the primary side of the total furnace system, including the furnace transformer, and the load variations are not too discernible until they represent a rather large change in load characteristics. Accordingly, damage to furnace lining may have already started and be well underway before a system, working from input data on the primary, can respond.

The proposed system deviates from those in use by using secondary data (furnace voltage and furnace current) and it also is responsible to a ratio of phase watts to phase var as the controlling elements.

The operation of this system will be as follows:
(1) The operator will establish a desired current level of operation by means of a potentiometer giving a reference to the controller.
(2) The operator will establish a desired power angle (power factor) that the phase electrode is to operate at. Again, this will be by means of a potentiometer giving a reference to the controller.

Once these settings have been made by the operator, the control will function to cause the following to occur:
(a) If the desired (requested) current is greater than actual electrode current, the controller will call for the electrode to be lowered.
(b) If the desired (requested) current is less than actual current, the controller will call for the electrode to be raised.
(c) If the power angle (established by dividing or ratioing the KW to the KVAR) is larger than desired, call for raising of the electrode to cause reduction in the power angle.
(d) If the power angle (established as above) is smaller than desired, call for lowering of the electrode to cause an increase in the power angle.

For this type of control operation, the prime control would be electrode current with the power angle modifier acting as a vernier to the main control loop.

With this proposed control system, individual electodes will be monitored and each phase will be controlled both as to phase current and phase angle. By using this type of control system, the individual phase setup will be by current and phase angle (power factor), in quantities the operator is familiar with rather than a ratio between voltage and current, as at present.

Also, by continually monitoring phase angle (power factor) for each electrode, certain adverse conditions of operation (cave-in, arc going to side-walls, etc.) can be sensed sooner (a quick change in the phase angle usually indicates the condition) and required corrective action initiated sooner than with present control systems. By taking corrective action sooner, the result of the adverse conditions can be minimized and/or eliminated, resulting in longer lining life and reduced damage to electrodes in the event of a cave-in. In any event, the proposed regulation scheme will result in lower total costs for steel-making when using arc furnaces.

THEORY AND OPERATION

Figure 2:
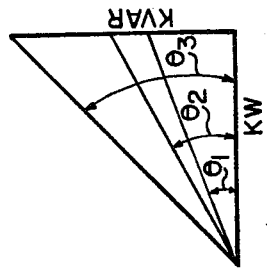
FIG. 2 is a diagram relating real and reactive power, used in explaining the operation of the present control system.

As shown in FIG. 2, a rather large change in reactive power (KVARS) produces a relatively small change in the angle $\theta$ while the real power remains substantially constant. The instant invention proposes to maintain real power at a desired level by constant monitoring of the arc current together with vernier modification of the electrode displacement by additionally monitoring the ratio (KVAR/KW).

Referring now back to FIG. 1, a reference current level is set by the operator by adjustment of potentiometer 50. This current is compared at comparator 48 with the actual current, and the algebraic summation thereof is sent to summer 44. Assume first that the KVARS are exactly in accordance with the desired ratio (KVAR/KW) (setting of potentiometer 40) so that the other input to summer 44 is zero. If the requested current is greater than the actual current, a negative signal to the summer 44 results in a negative signal being sent to the motor controller 52 and the electrode 12 is lowered until equality is obtained. Conversely, if the requested current is less than the actual current, a positive signal is sent to the motor controller 52 to raise the electrode until equality is obtained.

Assume that the actual arc curent and the reference arc current are equal. If the ratio (KVAR/KW) is larger than the requested ratio (KVAR/KW), a positive signal is sent to the summer 44 to raise the electrode. If the ratio (KVAR/KW) is less than the requested ratio, a negative signal is sent to the summer 44 to lower the electrode.

The magnitude of the signals which are sent to the summer 44 are commensurate with the magnitude of the correction required. For example, if the arc current signal is very much greater than the reference arc current, a greater d.c. signal will be sent to the summer 44 than if the difference is small. The same is true of the comparison of the actual (KVAR/KW) ratio with the desired (KVAR/KW) ratio.

The integrator 42, with the same time of integration adjusted, only sends a signal to the summer 44 if the needed correction persists over a predetermined period of time. This action prevents hunting and smooths the overall practical operation of the electric furnace.

I claim:
1. An electric arc furnace control system for controlling displacement of at least one furnace electrode comprising:
(a) means for deriving an arc current control signal by comparing the actual electrode arc current with a reference electrode arc current;
(b) means for deriving a reactive power control signal by comparing the ratio of actual reactive power to actual real power with a desired reference ratio: reactive power to real power; and
(c) means for summation for receiving said arc current and reactive power control signals and for deriving an output error signal which is a function of the desired rectilinear displacement of said electrode.

2. An electric arc furnace control system for controlling displacement of at least one furnace electrode comprising:
   (a) means for deriving a signal which is a function of the arc current of said electrode;
   (b) means for deriving a signal which is a function of the arc voltage across said electrode;
   (c) means for comparing said arc current signal with a reference arc current level, and for deriving a compared arc current output;
   (d) means for receiving said arc current and arc voltage signals and for providing watt and var signal outputs;
   (e) means for dividing said var signal by said watt signal to provide the ratio: VARS to WATTS;
   (f) means for comparing said ratio VARS to WATTS with a desired reference ratio: VARS to WATTS and for delivering a compared ratio VARS to WATTS output signal;
   (g) means for integrating said VARS to WATTS output signal and for delivering an integrated output;
   (h) means for algebraic summation for receiving said compared arc current output and said integrated output, and for delivering a control signal; and
   (i) means coupled to said electrode for receiving said control signal for rectilinear displacement of said electrode.

3. An electric arc furnace control system according to claim 2 wherein said arc current deriving means is a current transformer.

4. An electric arc furnace control system according to claim 2 wherein said arc voltage deriving means is a potential transformer.

5. An electric arc furnace control system according to claim 2 wherein said integrating means includes means for adjusting the timer interval of integration.

* * * * *